United States Patent
Houzumi et al.

(10) Patent No.: US 9,917,483 B2
(45) Date of Patent: Mar. 13, 2018

(54) BUS BAR UNIT

(71) Applicant: KAYABA INDUSTRY CO., LTD., Tokyo (JP)

(72) Inventors: Nobuji Houzumi, Kanagawa (JP); Tarou Matsumae, Kanagawa (JP); Yoshiteru Kurokawa, Kanagawa (JP); Suguru Sakamoto, Kanagawa (JP); Tohru Takimoto, Fukui (JP); Shingo Yamada, Fukui (JP)

(73) Assignee: KYB Corporation, Tokyo (JP)

( * ) Notice: Subject to any disclaimer, the term of this patent is extended or adjusted under 35 U.S.C. 154(b) by 310 days.

(21) Appl. No.: 14/772,025

(22) PCT Filed: Jan. 27, 2014

(86) PCT No.: PCT/JP2014/051634
§ 371 (c)(1),
(2) Date: Sep. 1, 2015

(87) PCT Pub. No.: WO2014/136495
PCT Pub. Date: Sep. 12, 2014

(65) Prior Publication Data
US 2016/0013691 A1 Jan. 14, 2016

(30) Foreign Application Priority Data
Mar. 8, 2013 (JP) ................. 2013-047234

(51) Int. Cl.
*H02K 3/04* (2006.01)
*H02K 3/52* (2006.01)

(52) U.S. Cl.
CPC ............... *H02K 3/04* (2013.01); *H02K 3/522* (2013.01); *H02K 2203/09* (2013.01)

(58) Field of Classification Search
CPC .................................................. H02K 2203/09
See application file for complete search history.

(56) References Cited

U.S. PATENT DOCUMENTS

2013/0049501 A1 2/2013 Fujisaki

FOREIGN PATENT DOCUMENTS

| | | |
|---|---|---|
| CN | 102957250 A | 3/2013 |
| JP | 06-233483 A | 8/1994 |
| JP | 2011-205875 A | 10/2011 |
| JP | 2012-029445 A | 2/2012 |
| JP | 2013-042633 A | 2/2013 |

*Primary Examiner* — Ramon M Barrera
(74) *Attorney, Agent, or Firm* — Rabin & Berdo, P.C.

(57) ABSTRACT

Each of busbars of a busbar unit includes a main body part that extends along a circumferential direction of the stator so that a plate thickness direction coincides with an axial direction of a stator; a projecting part that projects radially outwardly of the stator from outer periphery of the main body part; an extending part bent from the projecting parts, the extending part extending in the axial and radial direction of the stator; and a connecting part provided on a tip of the extending part, the connecting part being connectable to the winding wire ends of the coils. A position of the connecting part is specified in accordance with length of the extending part in the axial and radial directions of the stator.

5 Claims, 12 Drawing Sheets

BUS BAR UNIT

TECHNICAL FIELD

The prevent invention relates to a busbar unit for supplying a current to a winding wire of a motor or a generator by being connected to the winding wire.

BACKGROUND ART

It is known to use a busbar unit to supply a current to a winding wire of each coil from an external terminal part in a stator of a motor or the like.

JP6-233483A discloses a busbar unit including busbars that corresponds to a U-phase, a V-phase and a W-phase, and an insulating resin for holding these busbars in a state spaced apart in an axial direction of a stator.

The busbar includes an arcuate main body part that extends along a circumferential direction of the stator, and a connecting part that extends radially outwardly of the stator from the main body part and to be connected to a winding wire end of a coil.

SUMMARY OF INVENTION

In the above conventional busbar unit, the connecting parts of the busbars are not located at the same position in the axial direction of the stator (height positions differ). Thus, a dedicated jig is necessary for each height position, for example, in the case of connecting the winding wire end of the coil and the connecting part by a jig (welding jig), wherefore cost is increased.

The present invention aims to provide a busbar unit in which a connecting part of a busbar of each phase is arranged at the same position in an axial direction of a stator.

According to one aspect of the present invention, a busbar unit includes a plurality of busbars to which winding wire ends of a plurality of coils that constitute a stator are to be connected. The plurality of the busbars are arranged along an axial direction of the stator. Each of the busbars includes: a main body part that extends along a circumferential direction of the stator so that a plate thickness direction coincides with the axial direction of the stator; a projecting part that projects radially outwardly of the stator from an outer periphery of the main body part; an extending part bent from the projecting part, the extending part extending in the axial and radial directions of the stator; and a connecting part provided on a tip of the extending part, the connecting part being connectable to the winding wire ends of the coils. A position of the connecting part is specified in accordance with length of the extending part in the axial and radial directions of the stator.

DESCRIPTION OF EMBODIMENTS

With reference to the drawings, an embodiment of the present invention will be described.

Figure 1:
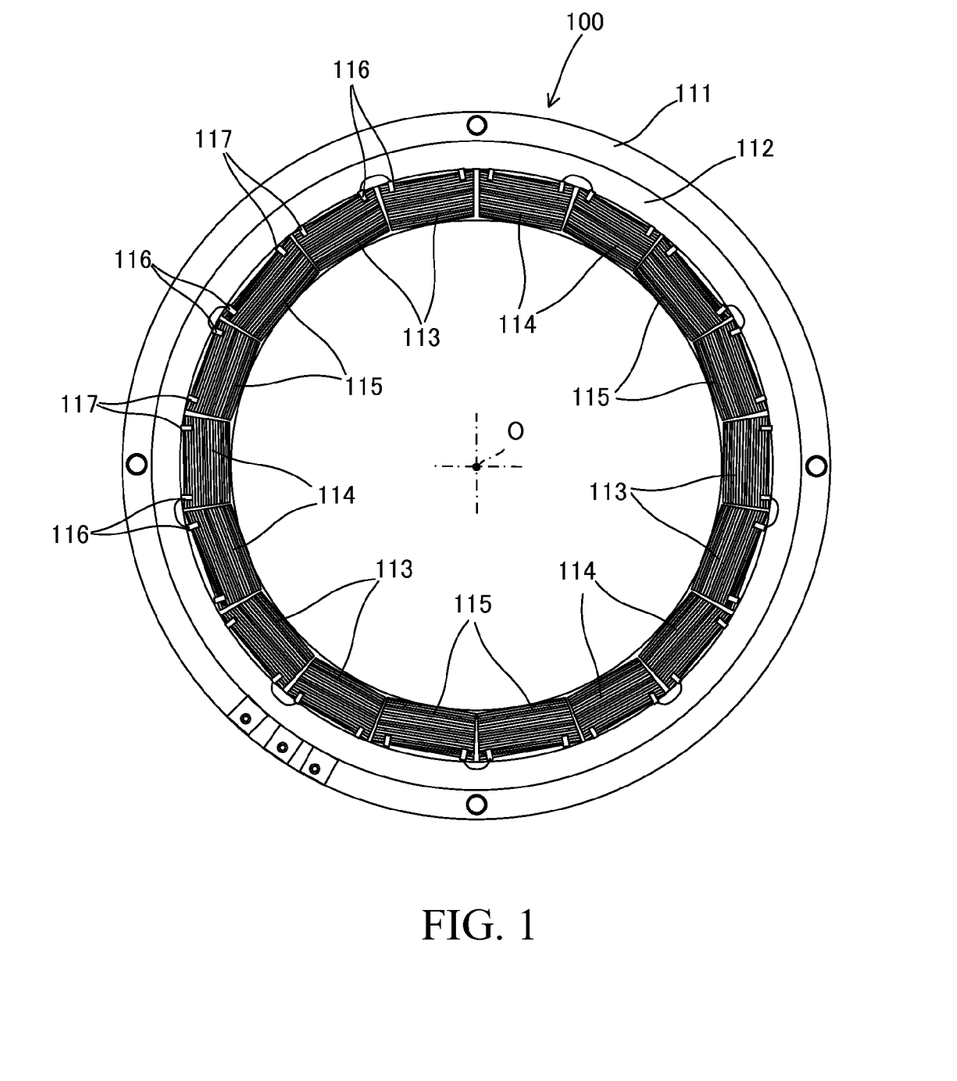
FIG. 1 is a structural diagram of a stator constituting a three-phase alternating current motor.

FIG. 1 is a structural diagram of a stator 100 constituting a three-phase alternating current motor.

A multitude of unillustrated teeth are formed to project toward an inner peripheral side on an annular stator core 112 held in a housing 111. Each tooth is wound with a copper wire to form a U-phase coil 113, a V-phase coil 114 or a W-phase coil 115.

A total of eighteen U-phase coils 113, V-phase coils 114 and W-phase coils 115 are annularly arranged in a circumferential direction of the stator 100 on the stator core 112. Three sets of the U-phase coils 113, three sets of the V-phase coils 114 and three sets of the W-phase coils 115, each set being composed of two phase coils, are arranged at an interval of 120 degree in the circumferential direction of the stator 100. Specifically, two adjacent V-phase coils 114 are arranged adjacent to two adjacent U-phase coils 113, and two adjacent W-phase coils 115 are arranged adjacent to the two adjacent V-phase coils 114.

In the U-phase coils 113, the V-phase coils 114 and the W-phase coils 115, winding wire ends 116 of the adjacent coils of each phase are connected and the remaining winding wire ends 117 are connected to a busbar unit 1 described later.

Figure 2:
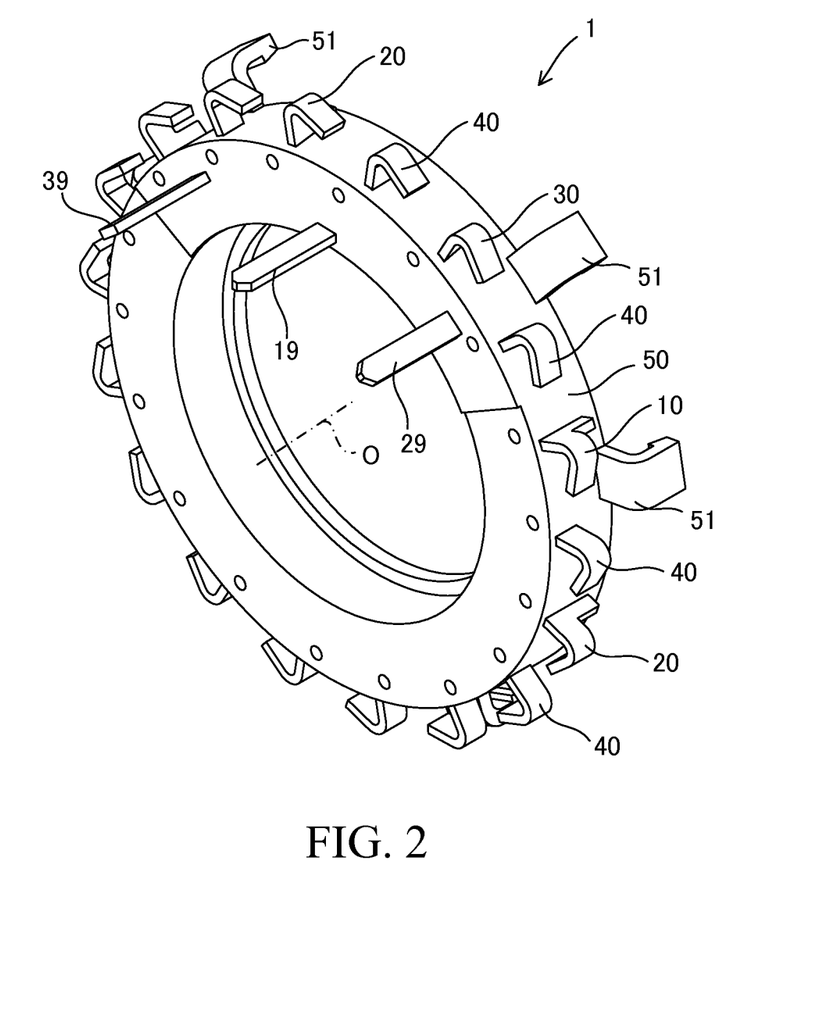
FIG. 2 is a perspective view showing a busbar unit.

FIG. 2 is a perspective view showing the busbar unit 1.

An axis O is a center axis of the busbar unit 1 or the stator 100. In the following description, an "axial direction" means an extension direction of the axis O, a "radial direction" means a radial direction centering on the axis O and a "circumferential direction" means a direction about the axis O.

The busbar unit 1 is provided on an axial end part of the stator 100 concentrically with the stator 100. The stator 100 is arranged at a right upper side of the busbar unit 1 in FIG. 2.

The busbar unit 1 has a first, second and third busbar 10, 20 and 30 corresponding to the respective phases, a fourth busbar 40 for neutral points for electrically connecting neutral points, and an insulation resin 50 for housing the first to fourth busbars 10, 20, 30 and 40 and holding the busbars 10, 20, 30 and 40 at predetermined positions while electrically insulating them. The busbars 10, 20, 30 and 40 and the insulating resin 50 are integrally molded, for example, by insert molding. The insulating resin 50 is fixed to the stator 100 by engaging a plurality of arms 51 projecting from the outer periphery thereof with engaging parts (not shown) on the outer periphery of the stator 100.

Figure 3:
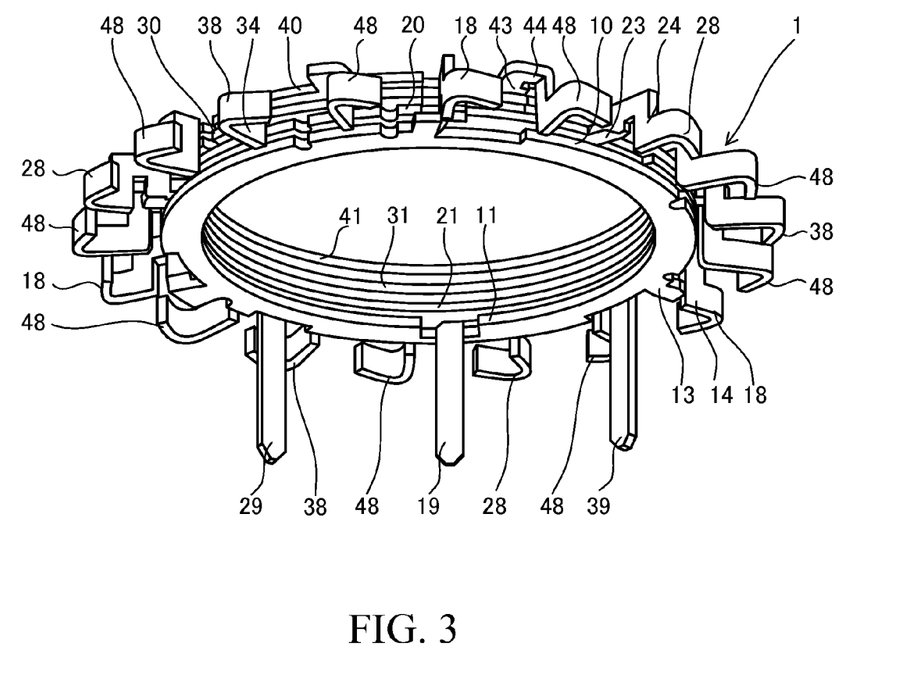
FIG. 3 is a perspective view showing stacked first to fourth busbars.

FIG. 3 is a perspective view showing an assembled state of the first to fourth busbars 10, 20, 30 and 40.

The busbar unit 1 includes the first busbar 10 to be connected to the W-phase coils 115, the second busbars 20 to be connected to the U-phase coils 113, the third busbar 30 to be connected to the V-phase coils 114, and the fourth busbar 40 for neutral points to be connected to all the U-phase coils 113, V-phase coils 114 and W-phase coils 115.

The first to fourth busbars 10, 20, 30 and 40 are arranged along the axial direction of the stator 100 in this order. The first busbar 10 is provided at a position most distant from the stator 100. The fourth busbar 40 is provided at a position closest to the stator 100.

The first to fourth busbars 10, 20, 30 and 40 includes, respectively, a main body part 11, 21, 31, 41 extending along the circumferential direction of the stator 100 so that a plate thickness direction coincides with the axial direction of the stator 100, a plurality of projecting parts 13, 23, 33 (see FIGS. 8 to 11), 43 projecting radially outwardly of the stator 100 from the outer periphery of the main body part 11, 21, 31, 41, extending parts 14, 24, 34, 44 bent from these projecting parts 13, 23, 33, 43 and extending in the axial and radial directions of the stator 100, and connecting parts 18, 28, 38, 48 provided on the tips of the extending parts 14, 24, 34, 44 and to be connected to the winding wire ends 117 of the phase coils 113, 114, 115.

The first to fourth busbars 10, 20, 30 and 40 are formed by bending the extending parts 14, 24, 34 and 44 from the projecting parts 13, 23, 33 and 43 after being punching out into predetermined shapes from an electrically conductive material in the form of a flat plate.

The main body part 11, 21, 31, 41 extends along the circumferential direction of the stator 100 so that the plate thickness direction thereof coincides with the axial direction of the stator 100. That is, a thickness of the main body part 11, 21, 31, 41 in the axial direction is a plate thickness of the electrically conductive material, and a width thereof in the radial direction is a punched width of the electrically conductive material.

The first busbar 10 that corresponds to a W-phase includes a W-phase terminal 19 that extends in the axial direction of the stator 100 from the main body part 11 to the outside of the insulating resin 50 and to be connected to an external wiring. The second busbar 20 that corresponds to a U-phase similarly includes a U-phase terminal 29. The third busbar 30 that corresponds to a V-phase similarly includes a V-phase terminal 39. The busbar unit 1 supplies a current supplied from an unillustrated power supply to each phase coil 113, 114, 115 via each phase terminal 19, 29, 39 as an external terminal.

Figure 4:
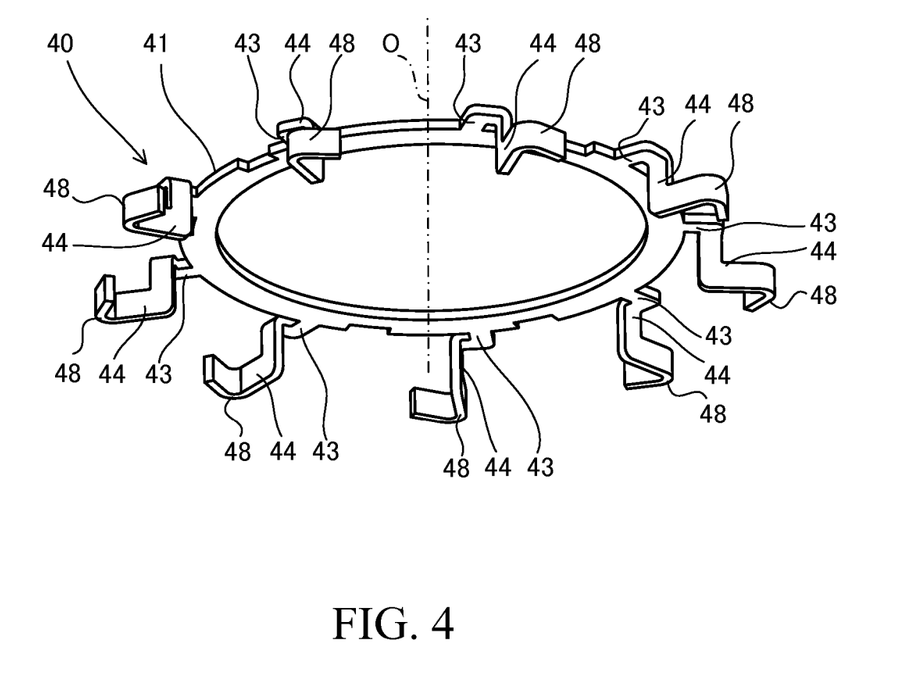
FIG. 4 is a perspective view showing the fourth busbar.
Figure 5:
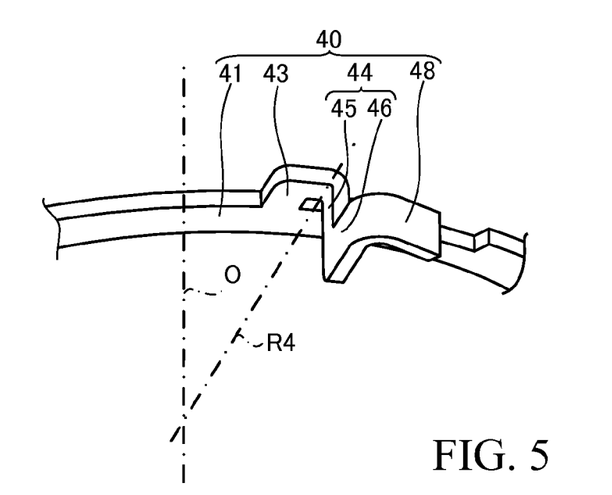
FIG. 5 is a perspective view showing a part of the fourth busbar.
Figure 6:
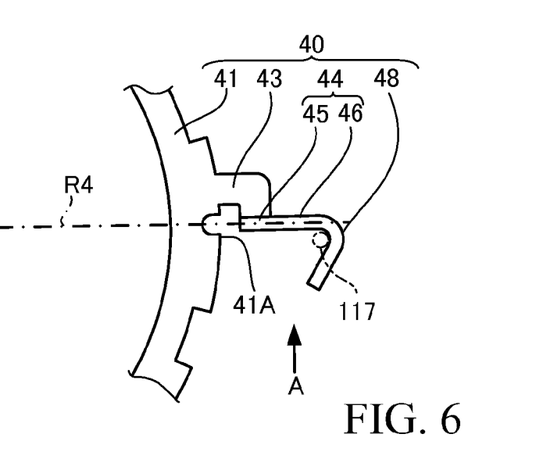
FIG. 6 is a front view showing the part of the fourth busbar.
Figure 7:
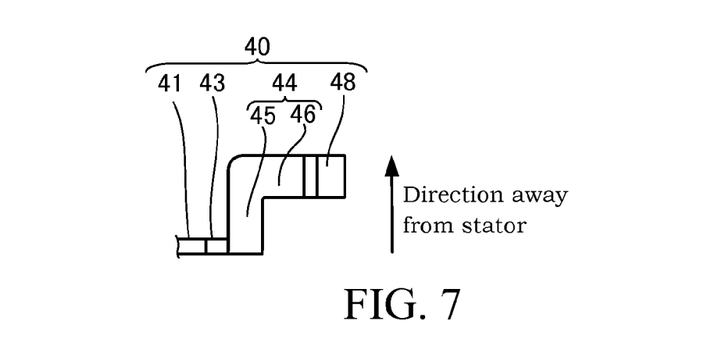
FIG. 7 is a view of the fourth busbar when viewed in a direction of an arrow A of FIG. 6.

FIG. 4 is a perspective view showing the fourth busbar 40, FIG. 5 is a perspective view showing a part of the fourth busbar 40, FIG. 6 is a front view showing the part of the fourth busbar 40, and FIG. 7 is a view of the fourth busbar 40 when viewed in a direction of an arrow A of FIG. 6.

The extending part 44 is formed into a cranked strip and includes a first axially extending part 45 extending in the axial direction of the stator 100 (direction away from the stator 100), and a radially extending part 46 extending in the radial direction of the stator 100 from the first axially extending part 45. The first axially extending part 45 and the radially extending part 46 are formed to have a punched width equal to or larger than that of the projecting part 43 to ensure a sufficient cross-sectional area of the electrically conductive material.

In bending process of the extending part 44, the extending part 44 that is clamped by a jig (not shown) is bent about a line R4 with respect to the projecting part 43 clamped by another jig (not shown).

In the fourth busbar 40, a clearance is formed between the extending part 44 and an outer periphery 41A of the main body part 41. By this, the interference with the main body part 41 in the jig that clamps the extending part 44 is avoided during the bending process.

The extending part 44 is bent from the projecting part 43 at a right angle along the line R4 extending in the radial direction of the stator 100.

The extending part 44 is bent in a direction away from the stator 100 with respect to the projecting part 43. The connecting part 48 is offset from the main body part 41 in the axial direction away from the stator 100.

The connecting part 48 is a part projecting from the tip of the radially extending part 46 in the radial direction and this part is bent into a hook shape.

Figure 8:
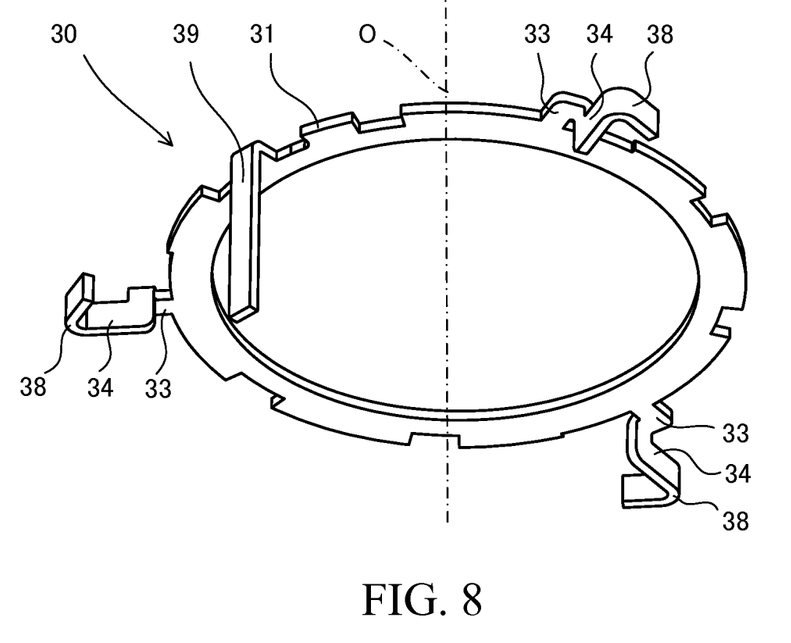
FIG. 8 is a perspective view showing the third busbar.
Figure 9:
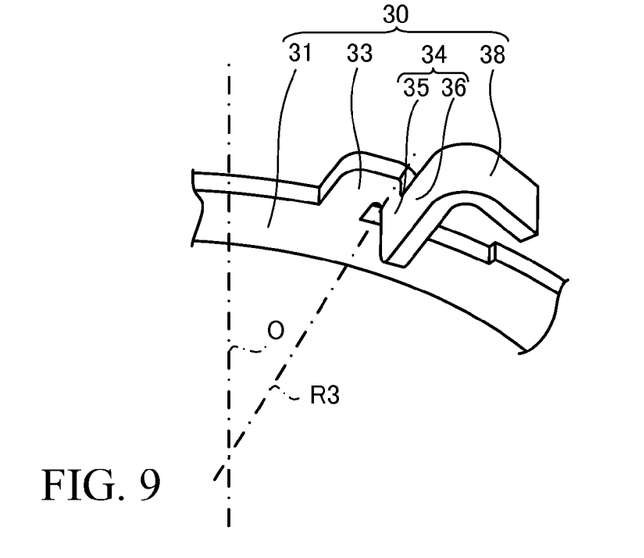
FIG. 9 is a perspective view showing a part of the third busbar.
Figure 10:
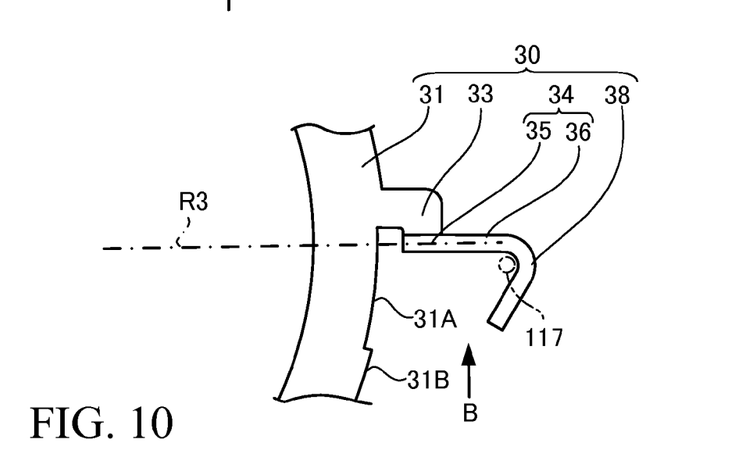
FIG. 10 is a front view showing the part of the third busbar.
Figure 11:
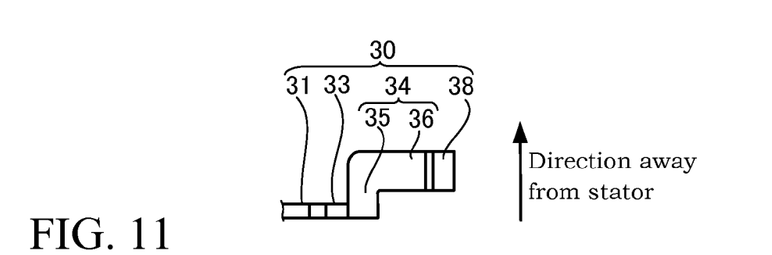
FIG. 11 is a view of the third busbar when viewed in a direction of an arrow B of FIG. 10.

FIG. 8 is a perspective view showing the third busbar 30, FIG. 9 is a perspective view showing a part of the third busbar 30, FIG. 10 is a front view showing the part of the third busbar 30, and FIG. 11 is a view of the third busbar 30 when viewed in a direction of an arrow B of FIG. 10.

The extending part 34 is formed into a cranked strip and includes a first axially extending part 35 extending in the axial direction of the stator 100 (direction away from the stator 100), and a radially extending part 36 extending in the radial direction of the stator 100 from the first axially extending part 35. The first axially extending part 35 and the radially extending part 36 are formed to have a punched width equal to or larger than that of the projecting part 33 to ensure a sufficient cross-sectional area of the electrically conductive material.

In bending process of the extending part 34, the extending part 34 that is clamped by a jig (not shown) is bent about a line R3 with respect to the projecting part 33 clamped by another jig (not shown).

In the third busbar 30, an outer periphery 31A of the main body part 31 which extends along the extending part 34 has a smaller outer diameter than an outer periphery 31B adjacent to the outer periphery 31A, and a clearance is formed between the extending part 34 and the outer periphery 31A of the main body part 31. By this, the interference with the main body part 31 in the jig that clamps the extending part 34 is avoided during the bending process.

The extending part 34 is bent from the projecting part 33 at a right angle along the line R3 extending in the radial direction of the stator 100.

The extending part 34 is bent in a direction away from the stator 100 with respect to the projecting part 33. The connecting part 38 is offset from the main body part 31 in the axial direction away from the stator 100.

The first axially extending part 35 of the third busbar 30 is formed to have a length shorter than that of the first axially extending part 45 of the fourth busbar 40 by the sum of the plate thickness of the main body part 31 and an axial distance between the main body parts 31 and 41. In this way, the connecting parts 38, 48 are arranged at the same position in the axial direction of the stator 100.

The connecting part 38 is a part projecting from the radial tip of the radially extending part 36 and this part is bent into a hook shape.

Figure 12:
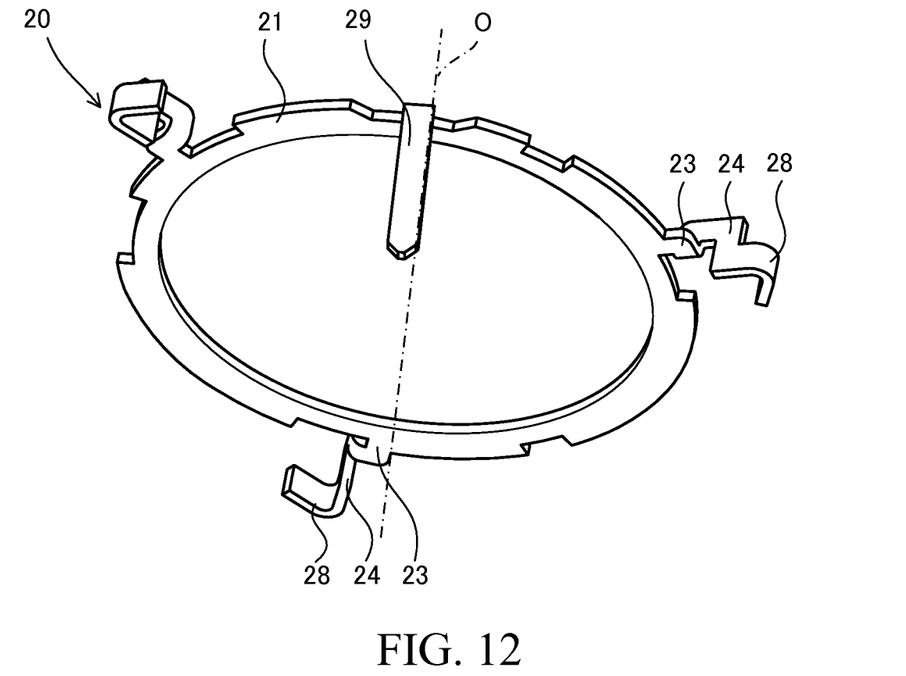
FIG. 12 is a perspective view showing the second busbar.
Figure 13:
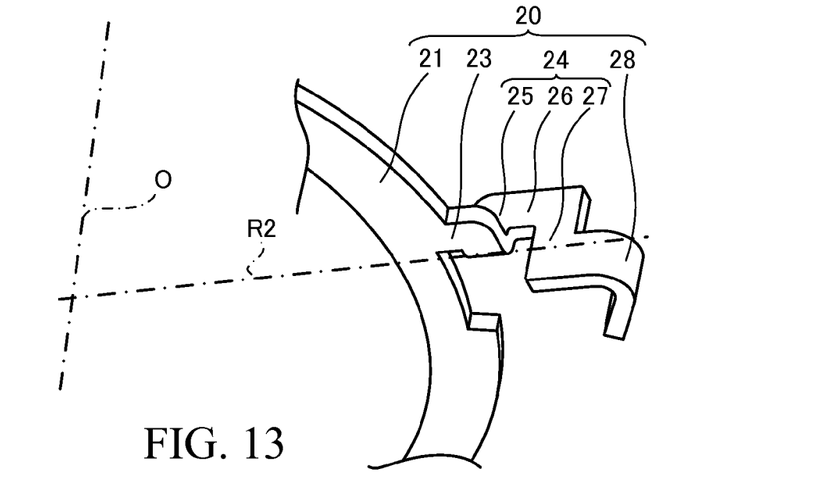
FIG. 13 is a perspective view showing a part of the second busbar.
Figure 14:
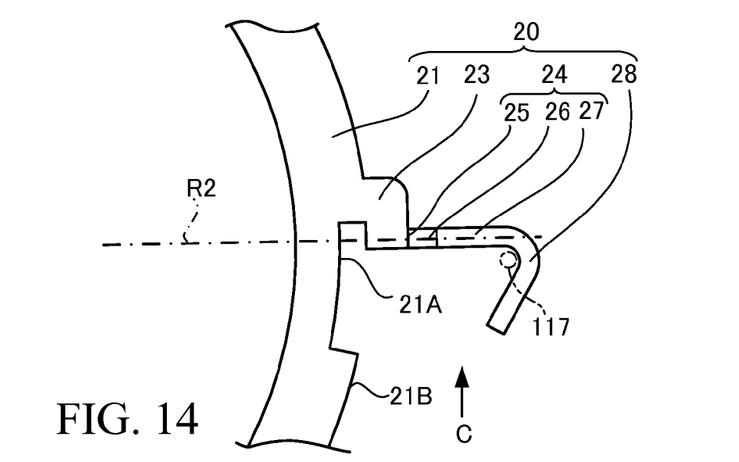
FIG. 14 is a front view showing the part of the second busbar.
Figure 15:
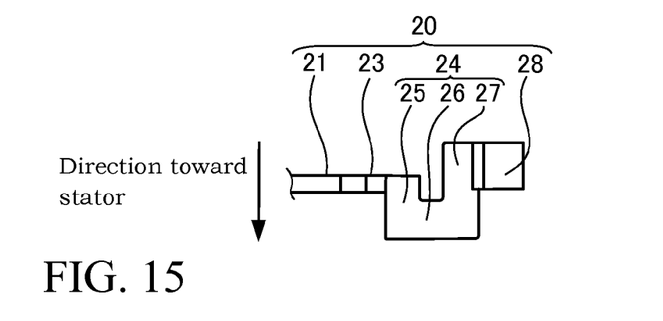
FIG. 15 is a view of the second busbar when viewed in a direction of an arrow C of FIG. 14.

FIG. 12 is a perspective view showing the second busbar 20, FIG. 13 is a perspective view showing a part of the second busbar 20, FIG. 14 is a front view showing the part of the second busbar 20, and FIG. 15 is a view of the second busbar 20 when viewed in a direction of an arrow C of FIG. 14.

The extending part 24 is formed into a cranked strip and includes a first axially extending part 25 extending in the axial direction of the stator 100 (direction toward the stator 100), a radially extending part 26 extending in the radial direction of the stator 100 from the first axially extending part 25 and a second axially extending part 27 extending in a direction parallel to the first axially extending part 25 (direction away from the stator 100) from an end part of the radially extending part 26 opposite to the first axially extending part 25. The first axially extending part 25, the radially extending part 26 and the second axially extending part 27 are formed to have a punched width equal to or larger than that of the projecting part 23 to ensure a sufficient cross-sectional area of the electrically conductive material.

In bending process, the extending part 24 that is clamped by a jig (not shown) is bent at a right angle about a line R2 with respect to the projecting part 23 clamped by another jig (not shown).

In the second busbar 20, an outer periphery 21A of the main body part 21 extending along the extending part 24 has a smaller outer diameter than an outer periphery 21B adjacent to the outer periphery 21A, and a clearance is formed between the extending part 24 and the outer periphery 21A of the main body part 21. By this, the interference with the main body part 21 in the jig that clamps the extending part 24 is avoided during the bending process.

The extending part 24 is bent from the projecting part 23 at a right angle along the line R2 extending in the radial direction of the stator 100.

Although the extending part 24 is bent in a direction toward the stator 100 with respect to the projecting part 23, the connecting part 28 is hardly offset with respect to the main body part 21 since the second axially extending part 27 extends in the direction away from the stator 100.

The connecting part 28 is a part projecting from the radial tip of the radially extending part 26 and this part is bent into a hook shape.

Figure 16:
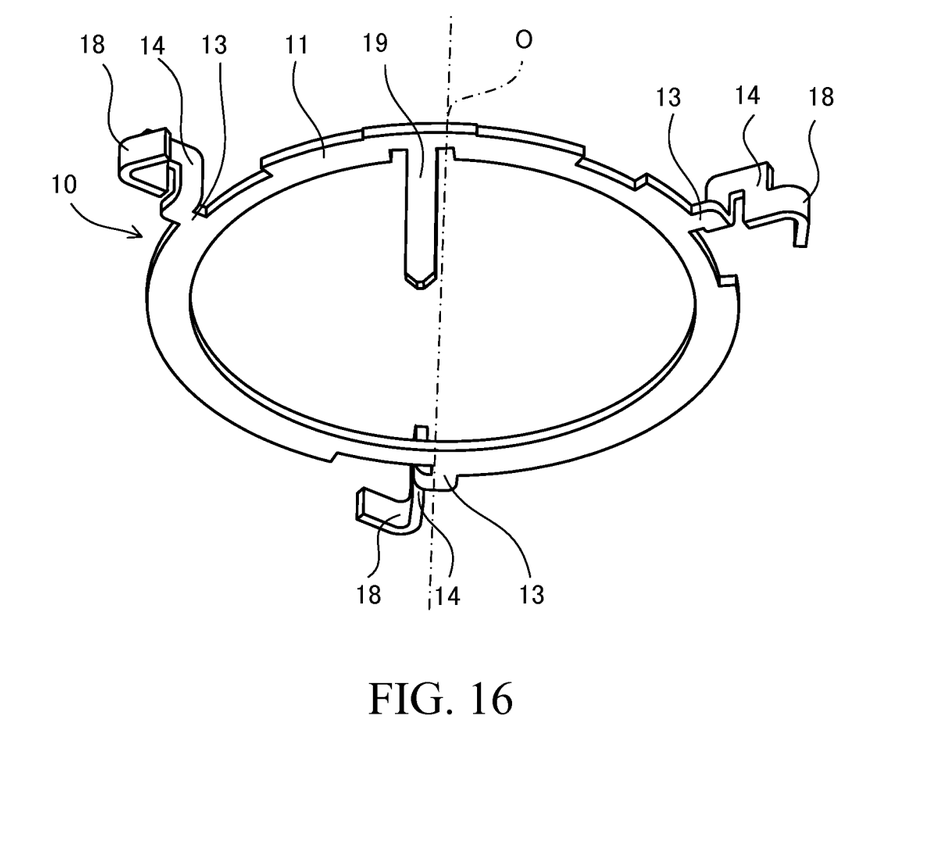
FIG. 16 is a perspective view showing the first busbar.
Figure 17:
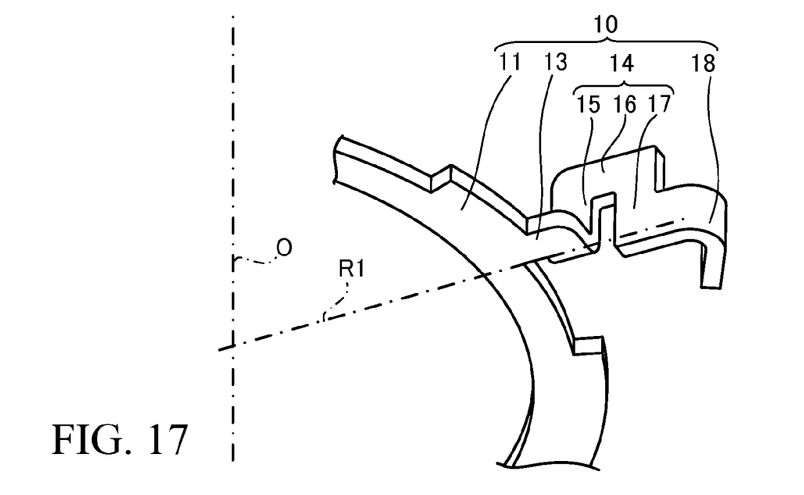
FIG. 17 is a perspective view showing a part of the first busbar.
Figure 18:
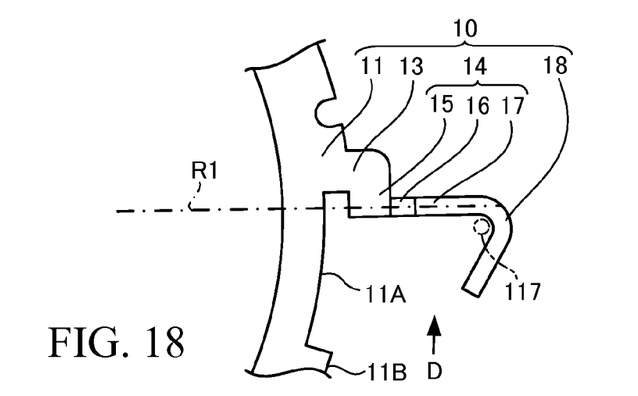
FIG. 18 is a front view showing the part of the first busbar.
Figure 19:
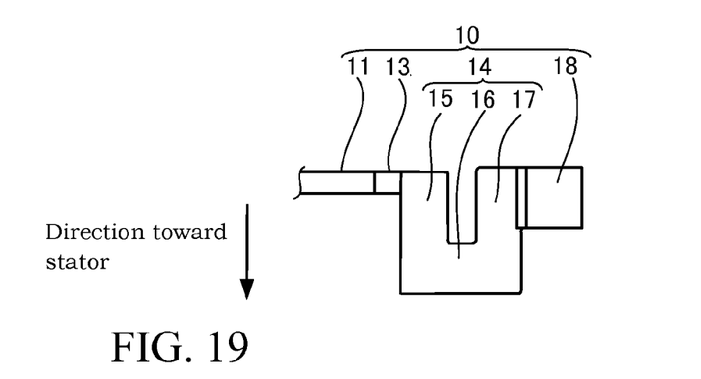
FIG. 19 is a view of the first busbar when viewed in a direction of an arrow D of FIG. 18.

FIG. 16 is a perspective view showing the first busbar 10, FIG. 17 is a perspective view showing a part of the first busbar 10, FIG. 18 is a front view showing the part of the first busbar 10, and FIG. 19 is a view of the first busbar 10 when viewed in a direction of an arrow D of FIG. 18.

The extending part 14 is formed into a cranked strip and includes a first axially extending part 15 extending in the axial direction of the stator 100 (direction toward the stator 100), a radially extending part 16 extending in the radial direction of the stator 100 from the first axially extending part 15 and a second axially extending part 17 extending in a direction parallel to the first axially extending part 15 (direction away from the stator 100) from an end part of the radially extending part 16 opposite to the first axially extending part 15. The first axially extending part 15, the radially extending part 16 and the second axially extending part 17 are formed to have a punched width equal to or larger than that of the projecting part 13 to ensure a sufficient cross-sectional area of the electrically conductive material.

In bending process, the extending part 14 that is clamped by a jig (not shown) is bent at a right angle about a line R1 with respect to the projecting part 13 clamped by another jig (not shown).

In the first busbar 10, an outer periphery 11A of the main body part 11 extending along the extending part 14 has a smaller outer diameter than an outer periphery 11B adjacent to the outer periphery 11A, and a clearance is formed between the extending part 14 and the outer periphery 11A of the main body part 11. By this, the interference with the main body part 11 in the jig that clamps the extending part 14 is avoided during bending.

The extending part 14 is bent from the projecting part 13 at a right angle along the line R1 extending in the radial direction of the stator 100.

The extending part 14 is bent in a direction toward the stator 100 with respect to the projecting part 13. An axial length of the second axially extending part 17 is set equal to that of the first axially extending part 15. This makes an offset distance zero of the connecting part 18 from the main body part 11 in the axial direction of the stator 100.

The first axially extending part 15 of the first busbar 10 is formed to be longer than the first axially extending part 25 of the second busbar 20 by the sum of the plate thickness of the main body part 21 and an axial distance between the main body parts 11 and 21. In this way, the connecting parts 18, 28 are arranged at the same position in the axial direction of the stator 100.

The connecting part 18 is a part projecting from the radial tip of the radially extending part 16 and this part is bent into a hook shape.

The hook-shaped connecting parts 18, 28, 38 and 48 are bent in the plate thickness direction to be joined to the winding wire ends 117 of the phase coils 113, 114 and 115, respectively.

It should be noted that the shapes of the connecting parts 18, 28, 38 and 48 are not limited to the hook shapes as described above and may be other shapes.

Figure 20:
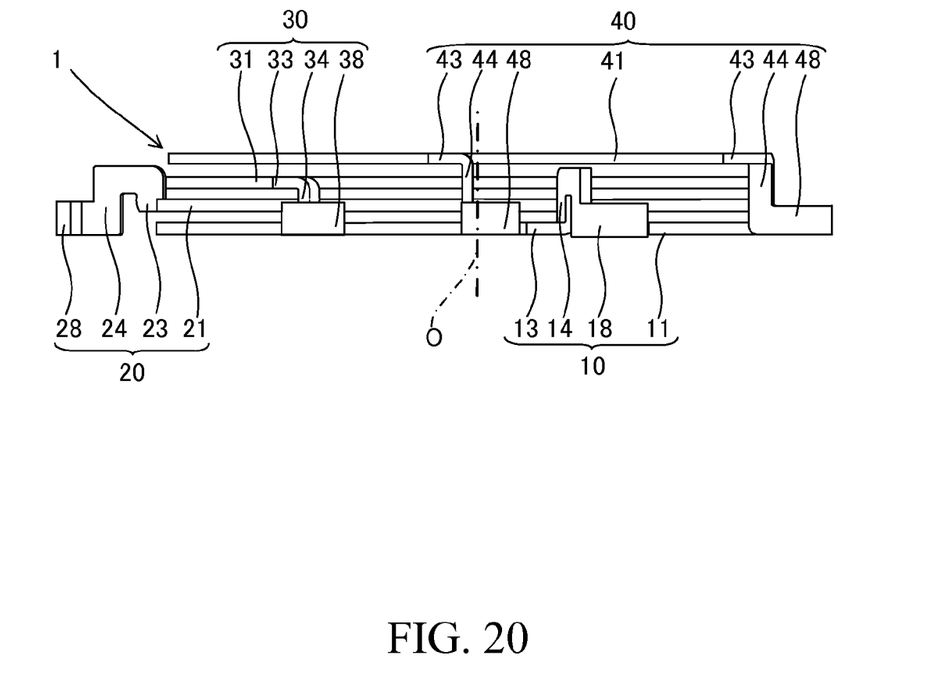
FIG. 20 is a side view showing the stacked first to fourth busbars.

FIG. 20 is a side view showing an assembled state of the first to fourth busbars 10, 20, 30 and 40 without the insulating resin 50.

The first to fourth busbars 10, 20, 30 and 40 are so formed that the connecting parts 18, 28, 38 and 48 thereof are arranged at the same position in the axial direction of the stator 100. The winding wire ends 117 are joined to the connecting parts 18, 28, 38 and 48 by a caulking process and a welding process.

Since the connecting parts 18, 28, 38 and 48 are arranged to be accommodated at the same position as the main body parts 11, 21 in the axial direction and all the connecting parts 18, 28, 38 and 48 are accommodated between the first and fourth busbars 10 and 40, the busbar unit 1 can be miniaturized.

The first to fourth busbars 10, 20, 30 and 40 are integrated by insert molding in a state where the projecting parts 13, 23, 33 and 43 are arranged at equal intervals in the circumferential direction. The insert molding is performed by placing the first to fourth busbars 10, 20, 30 and 40 in a mold (not shown) and pouring the insulating resin 50 into the mold.

After the insulating resin 50 is cured, the busbar unit 1 in which the first to fourth busbars 10, 20, 30 and 40 and the insulating resin 50 are joined is taken out of the mold, whereby the busbar unit 1 shown in FIG. 2 is completed.

According to the above embodiment, the following effects are achieved.

The busbar unit 1 includes a plurality of busbars 10, 20, 30 and 40 to which the winding wire ends of a plurality of coils constituting the stator 100 are to be connected. The plurality of busbars 10, 20, 30 and 40 include the main body parts 11, 21, 31 and 41 extending along the circumferential direction of the stator 100 so that the plate thickness direction coincides with the axial direction of the stator 100, the projecting parts 13, 23, 33 and 43 projecting radially outwardly of the stator 100 from the outer peripheries of the main body parts 11, 21, 31 and 41, the extending parts 14, 24, 34 and 44 bent from the projecting parts 13, 23, 33 and 43, the extending parts 14, 24, 34 and 44 extending in the axial and radial directions of the stator 100, and the connecting parts 18, 28, 38 and 48 provided on the tips of the extending parts 14, 24, 34 and 44, the connecting parts 18, 28, 38 and 48 being to be connected to the winding wire ends of the coils. The positions of the connecting parts 18, 28, 38 and 48 are specified in accordance with lengths of the extending parts 14, 24, 34 and 44 extending in the axial and radial directions of the stator 100.

In this way, all the connecting parts 18, 28, 38 and 48 can be arranged at the same position in the axial direction of the stator 100 by adjusting the lengths of the extending parts 14, 24, 34 and 44 extending in the axial direction of the stator 100. Thus, it is not necessary to use different dedicated jigs (welding jigs) to connect the winding wire ends 117 of the phase coils 113, 114 and 115 and the connecting parts 18, 28, 38 and 48, wherefore the cost of a product can be reduced.

Further, in the busbar 10 in which the main body part 11 is provided at the position most distant from the stator 100, out of the plurality of busbars 10, 20, 30 and 40, the extending parts 14 are bent in the direction toward the stator 100 with respect to the projecting parts 13 and the connecting parts 18 are arranged at the predetermined position in the axial direction of the stator 100. Further, in the busbar 40 provided at the position closest to the stator 100, out of the plurality of busbars 10, 20, 30 and 40, the extending parts 44 are bent in the direction away from the stator 100 with respect to the projecting parts 43 and the connecting parts 48 are arranged at the predetermined position in the axial direction of the stator.

In this way, the busbars 10, 20, 30 and 40 have a simple structure of bending only the extending parts 14, 24, 34 and 44 from the projecting parts 13, 23, 33 and 43, and all the connecting parts 18, 28, 38 and 48 can be arranged at the same position in the axial direction of the stator 100 by adjusting the lengths of the extending parts 14, 24, 34 and 44 extending in the axial direction of the stator 100. Thus, it is not necessary to use different dedicated jigs (welding jigs) to connect the winding wire ends 117 of the phase coils 113, 114 and 115 and the connecting parts 18, 28, 38 and 48, wherefore the cost of a product can be reduced.

Further, the busbar unit 1 includes such first to fourth busbars 10, 20, 30 and 40 that the main body parts 11, 21, 31 and 41 are successively arranged in the direction toward the stator 100 from the position distant from the stator 100. In the first and second busbars 10, 20, the extending parts 14, 24 are bent in the direction toward the stator 100 with respect to the projecting parts 13, 23. In the third and fourth busbars 30, 40, the extending parts 34, 44 are bent in the direction away from the stator 100 with respect to the projecting parts 33, 43. In this way, the connecting parts 18, 28, 38 and 48 can be aligned at the same position in the axial direction of the stator 100.

Further, since the extending parts 14, 24, 34 and 44 are bent from the projecting parts 13, 23, 33 and 43 along the lines R1, R2, R3 and R4 extending in the radial direction of the stator 100, the extending parts 14, 24, 34 and 44 are shaped to extend in the axial and radial directions of the stator 100. By adjusting the lengths of the extending parts 14, 24, 34 and 44 extending in the axial and radial directions of the stator 100, all the connecting parts 18, 28, 38 and 48 can be arranged at the position under the same condition with respect to the axial and radial directions of the stator 100. Further, since the extending parts 14, 24, 34 and 44 are formed by bending with respect to the projecting parts 13, 23, 33 and 43 only once and the number of bending can be reduced as compared with conventional busbars, structure simplification can be realized and man-hours during production can be reduced.

Further, the extending parts 14, 24, 34 and 44 include the first axially extending parts 15, 25, 35 and 45 bent from the projecting parts 13, 23, 33 and 43 and extending in the axial direction of the stator 100, and the radially extending parts 16, 26, 36 and 46 extending in the radial direction of the stator 100 from the first axially extending parts 15, 25, 35 and 45, and are formed into a crank shape by the first axially extending parts 15, 25, 35 and 45 and the radially extending parts 16, 26, 36 and 46. This enables all the connecting parts 18, 28, 38 and 48 to be arranged at the position under the same condition with respect to the axial and radial directions of the stator 100 by adjusting the lengths of the first axially extending parts 15, 25, 35 and 45 extending in the axial direction and the lengths of the radially extending parts 16, 26 36 and 46 extending in the radial direction of the stator 100.

Further, the extending parts 14, 24 of the first and second busbars 10, 20 include the second axially extending parts 17, 27 extending parallel to the first axially extending parts 15, 25 in the axial direction of the stator 100 from the end parts of the radially extending parts 16, 26 opposite to the first axially extending parts 15, 25, and are formed into a crank shape by the first axially extending parts 15, 25, the radially extending parts 16, 26 and the second axially extending parts 17, 27. This enables short offset distances of the connecting parts 18, 28 from the main body parts 11, 21 in the axial direction to be set in accordance with the lengths of the first axially extending parts 15, 25 and the second axially extending parts 17, 27 extending in the axial direction of the stator 100.

Further, the connecting parts 18, 28, 38 and 48 are respectively arranged on the same circumference. Since the connecting parts 18, 28, 38 and 48 are arranged on the same circumference in this way, the jig for welding can be simply configured and failures caused by welding can be reduced.

Embodiments of this invention were described above, but the above embodiments are merely examples of applications of this invention, and the technical scope of this invention is not limited to the specific constitutions of the above embodiments.

For example, although a case where the first to fourth busbars 10, 20, 30 and 40 have an annular shape has been illustrated in the above embodiment, they may have an arcuate shape.

Further, although a case where four types of busbars 10, 20, 30 and 40 are provided has been illustrated in the above embodiment, three or less or five or more types of busbars may be provided according to the type of a motor.

Further, although the three-phase alternating current motor including eighteen coils 113, 114 and 115 has been illustrated in the above embodiment, the number of the coils is not limited to this.

Further, although the first to fourth busbars 10, 20, 30 and 40 have been arranged in the order of the first busbar 10, the second busbar 20, the third busbar 30 and the fourth busbar 40 in the busbar unit 1 in the above embodiment, they may be arranged in a different order.

Further, although a case where the busbar unit is connected to the motor for generating a motive force by power has been illustrated in the above embodiment, application to a generator for generating a motive force by power is also possible.

This application claims priority based on Japanese Patent Application No. 2013-047234 filed with the Japan Patent Office on Mar. 8, 2013, the entire contents of which are incorporated into this specification.

The invention claimed is:

1. A busbar unit, comprising a plurality of busbars to which winding wire ends of a plurality of coils that constitute a stator are to be connected, the plurality of the busbars being arranged along an axial direction of the stator, wherein each of the busbars includes:
    a main body part that extends along a circumferential direction of the stator so that a plate thickness direction coincides with the axial direction of the stator;
    a projecting part that projects radially outwardly of the stator from an outer periphery of the main body part;
    an extending part bent from the projecting part, the extending part extending in the axial direction and a radial direction of the stator; and
    a connecting part provided on a tip of the extending part, the connecting part being connectable to the winding wire ends of the coils,
a position of the connecting part is specified in accordance with length of the extending part in the axial and radial directions of the stator;
the plurality of the busbars comprise first to fourth busbars successively arranged in a direction toward the stator from a position distant from the stator;
the extending part is bent in the direction toward the stator with respect to the projecting part in the first and second busbars; and
the extending part is bent in a direction away from the stator with respect to the projecting part in the third and fourth busbars.

2. The busbar unit according to claim 1, wherein:
the extending part is bent in a direction toward the stator with respect to the projecting part and the connecting part is arranged at a predetermined position in the axial direction of the stator in a busbar provided at a position most distant from the stator out of the plurality of the busbars; and
the extending part is bent in a direction away from the stator with respect to the projecting part and the connecting part is arranged at the predetermined position in the axial direction of the stator in a busbar provided at a position closest to the stator out of the plurality of the busbars.

3. The busbar unit according to claim 1, wherein:
the extending part includes a first axially extending part bent from the projecting part, the first axially extending part extending in the axial direction of the stator; and a radially extending part that extends in the radial direction of the stator from the first axially extending part, and the extending part is formed into a crank shape by the first axially extending part and the radially extending part.

4. The busbar unit according to claim 3, wherein:
the extending part of each of the first and second busbars includes a second axially extending part that extends parallel to the first axially extending part in the axial direction of the stator from an end part of the radially extending part opposite to the first axially extending part, and the extending part is formed into a crank shape by the first axially extending part, the radially extending part and the second axially extending part.

5. The busbar unit according to claim 1, wherein:
the connecting parts are respectively arranged on a same circumference.

* * * * *